(12) United States Patent
Berk et al.

(10) Patent No.: US 10,419,517 B2
(45) Date of Patent: Sep. 17, 2019

(54) CURRENT EVENT TRIGGERED WEBSITE UPDATES

(71) Applicant: Go Daddy Operating Company, LLC, Scottsdale, AZ (US)

(72) Inventors: Josh Berk, Scottsdale, AZ (US); Jared Lewandowski, Campbell, CA (US); Justin Tsai, San Francisco, CA (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 371 days.

(21) Appl. No.: 15/448,289

(22) Filed: Mar. 2, 2017

(65) Prior Publication Data
US 2018/0255120 A1 Sep. 6, 2018

(51) Int. Cl.
| | |
|---|---|
| *H04L 29/08* | (2006.01) |
| *H04L 12/58* | (2006.01) |
| *G06F 16/22* | (2019.01) |
| *G06F 16/951* | (2019.01) |
| *G06F 16/958* | (2019.01) |
| *H04L 12/24* | (2006.01) |
| *G06Q 30/02* | (2012.01) |

(52) U.S. Cl.
CPC .............. *H04L 67/02* (2013.01); *G06F 16/22* (2019.01); *G06F 16/951* (2019.01); *G06F 16/986* (2019.01); *H04L 51/32* (2013.01); *G06Q 30/0251* (2013.01); *G06Q 30/0252* (2013.01); *H04L 41/5083* (2013.01)

(58) Field of Classification Search
CPC ......... H04L 67/02; H04L 51/32; H04L 51/02; H04L 51/24; G06F 16/22; G06F 16/986; G06F 16/951; G06Q 30/0252; G06Q 30/0202; G06Q 30/0207; G06Q 30/0239
USPC ....................................................... 709/204
See application file for complete search history.

(56) References Cited

U.S. PATENT DOCUMENTS

| | | | |
|---|---|---|---|
| 2005/0171836 A1* | 8/2005 | Leacy ................ | G06Q 30/02 705/14.23 |
| 2007/0162328 A1* | 7/2007 | Reich ................. | G06Q 30/02 705/14.58 |
| 2007/0208616 A1* | 9/2007 | Choi .................. | G06Q 30/02 705/14.13 |
| 2009/0222416 A1* | 9/2009 | Tymoshenko ...... | G06F 17/2247 |
| 2011/0319149 A1* | 12/2011 | Hwang .............. | G06Q 30/0239 463/17 |
| 2014/0278848 A1* | 9/2014 | Candor .............. | G06Q 30/0252 705/14.5 |
| 2015/0088607 A1* | 3/2015 | Georgoff ............ | G06Q 30/0246 705/7.31 |

(Continued)

*Primary Examiner* — Patrice L Winder
*Assistant Examiner* — Lam H Duong
(74) *Attorney, Agent, or Firm* — Quarles & Brady LLP (57) ABSTRACT

A website hosting system may host a plurality of websites and update and publish some of the websites that may be customized based on a current event received from news sources and/or social media platforms. The website hosting system may update different websites differently for the same event by determining industries and marketing areas for the hosted websites and the affected industries and affected areas for the detected event. The website hosting system may update and customize websites with an industry and marketing area that are within the news event's effected industries and affected areas.

20 Claims, 5 Drawing Sheets

(56) References Cited

U.S. PATENT DOCUMENTS

2018/0081866 A1\* 3/2018 DiTomaso .............. G06F 17/24
2019/0068472 A1\* 2/2019 Carroll ................ G06F 16/9537

\* cited by examiner

FIG. 1

Database 140

| Website/Domain Name | Industry | Market Area |
|---|---|---|
| | | |
| GoodEats.com | Restaurant | Port-au-Prince, Haiti |
| | Catering | Haiti |
| | | |
| ClothesToWear.com | Clothing | New York, New York |
| | | World-wide |
| | | |
| SportsStuff.com | Sporting Paraphernalia | United States |
| | | Europe |

FIG. 2

| Event Tokens | Affected Industry | Affected Area | Actions |
|---|---|---|---|
|  |  |  |  |
| "Hurricane" and "Haiti" | Restaurant | Haiti | Offer 10% of proceeds to relief efforts in Haiti |
|  |  |  |  |
| "Blizzard" and "New York" | Clothing | New York, New York | Create Sales around Winter Clothing, Rearrange Website Layout to Highlight Winter Clothing |
|  |  |  |  |
| "Phoenix Suns" and "Win" | Sports | Phoenix, Arizona | Highlight or Raise Prices on Sun's Paraphernalia |

CURRENT EVENT TRIGGERED WEBSITE UPDATES

FIELD OF THE INVENTION

The present invention generally relates to the field of updating and publishing a website based on events parsed from one or more feeds from news sources and/or social media platforms.

SUMMARY OF THE INVENTION

The present invention provides methods for updating websites based on current events extracted from news sources and/or social media platforms. A single news event may trigger different updates to different websites that are hosted by a website hosting system.

The website hosting system may host one or more websites. Each hosted website may be connected in a database to one or more industries and to one or more market areas. As an example, a website may be connected in the database to the industry of restaurants and the market area of Phoenix, Ariz. The website hosting system may receive one or more industries and one or more marketing areas from the contact, i.e. the owner or a person or entity appointed by the owner (agent), of the website. In addition or alternatively, the website hosting system may parse the website and determine the website's one or more industries and one or more marketing areas.

The website hosting system may continually monitor one or more new sources of local and/or world events and/or one or more social media platforms to detect an event. The event may be a news event or a trending topic on a social media platform. The website hosting system may determine one or more affected industries and one or more affected areas for each received event.

The website hosting system may determine that one or more industries for a website is at least partially included in one or more affected industries of the event and that one or more market areas for the website is at least partially included in the one or more affected areas of the event.

The website hosting system may select an action for the website based on the affected industries and the affected marketing areas of the website. As an example, the website hosting system may select the action of advertising a winter coat for a website in the clothing industry with a world-wide market area, upon detecting an event of a winter storm approaching New York, N.Y. It should be appreciated that some events may have a larger local impact with a smaller world-wide impact. Some websites that are not part of the local impact, i.e., have websites directed towards customers that are not directly affected, may still wish to provide information or assist in providing relief efforts even to areas outside of the website's market area.

The website hosting system may 1) always request approval before updating and publishing websites, 2) automatically, preferably by receiving preapproval for automatic updates, make updates and publish websites or 3) a combination, where some website require approval for every update while other websites may be automatically updated and published.

In some embodiments, the contact for the website may receive on a client device an example of what the website looks like with the update before the website is published to the Internet and made publicly available. Only after the contact approves the example website is the website actually updated and published on the Internet.

In some embodiments, actions are tied to premade notifications and stored in a database. When an action is selected as being appropriate based on a received event, the associated notification may be located in the database and quickly sent to the contact to approve the action on the website.

After the website has been updated and published to the Internet, a notification may be sent to the contact of the websites notifying the contact that the website has been updated and published due to the received event.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Figure 1:
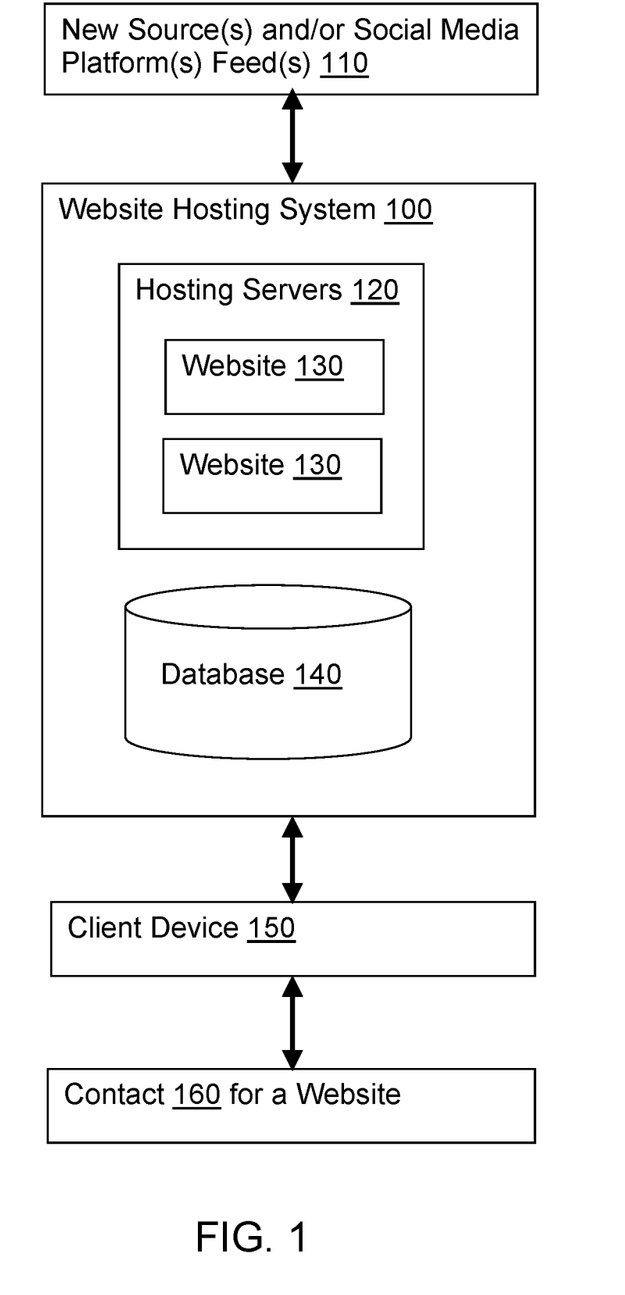
FIG. 1 is a block diagram of a system that may be used to update one or more websites in response to news events and/or information from one or more social media platforms.
Figure 4:
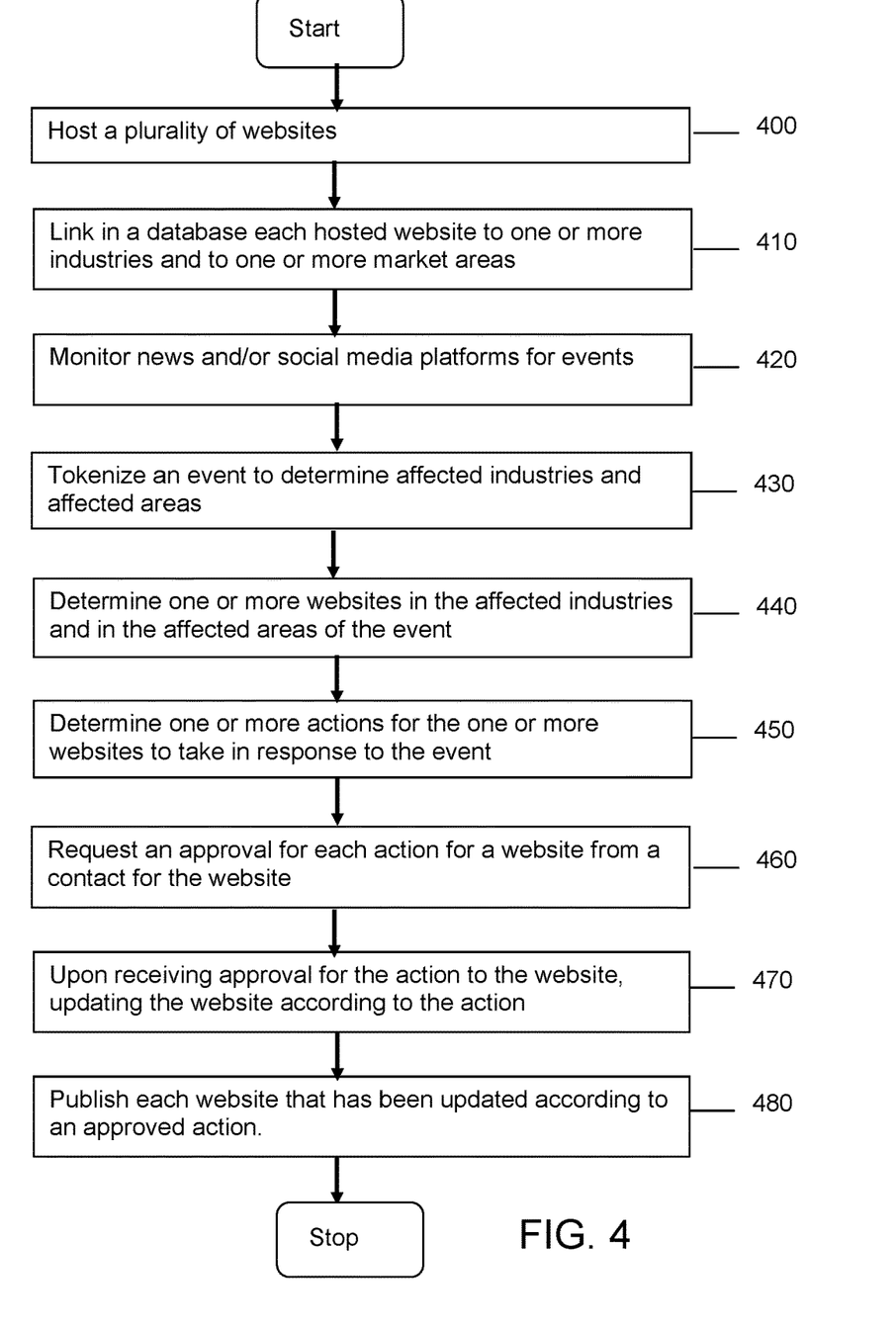
FIG. 4 is a flowchart of an example method for updating one or more websites in response to news events and/or information from one or more social media platforms.

FIG. 1 is a block diagram of a system and FIG. 4 is a flowchart that may be used to practice the present invention. A computer network is a collection of links and nodes (e.g., multiple computers and/or other devices electronically connected together) arranged so that information may be passed from one part of the computer network to another over multiple links and through various nodes. Examples of computer networks include the Internet, the public switched telephone network, the global Telex network, computer networks (e.g., an intranet, an extranet, a local-area network, or a wide-area network), wired networks, and wireless networks.

The arrow between the illustrated news source(s) and/or social media platform(s) feed(s) 110 and the website hosting system 100 and the arrow between the website hosting system 100 and the client device 150 are defined to be a computer network such as the Internet. The news source and/or social media platforms 110, website hosting system 100 and client devices 150 may be connected through the Internet and communicate with each other using various communication protocols, such as, as non-limiting examples, Transmission Control Protocol/Internet Protocol (TCP/IP) and Really Simple Syndication (RSS).

The Internet is a worldwide network of computers and computer networks arranged to allow the easy and robust exchange of information between computer users on client devices and websites. Hundreds of millions of people around the world have access to computers (client devices 150) connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites 130 may consist of a single webpage, but typically consist of multiple interconnected and related webpages. Websites, unless very large and complex or have unusual traffic demands, typically reside on a single server and are prepared and maintained by a single individual or entity (although websites may also residing on multiple server). Menus, links, tabs, etc. may be used to move between different web pages within the website or to move to a different website.

Websites 130 may be created using HyperText Markup Language (HTML) to generate a standard set of tags that define how the webpages for the website 130 are to be displayed. Users of the Internet may access content providers' websites 130 using software known as an Internet browser, such as MICROSOFT INTERNET EXPLORER or MOZILLA FIREFOX. After the browser has located the desired webpage, the browser may request and receive information from the webpage, typically in the form of an HTML document, and then displays the webpage content for the user on the client device 150. The user then may view other webpages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), website hosting systems 100, such as hosting companies, exist that offer website hosting services. These website hosting systems 100 provide the hardware, software, and electronic communication means necessary to connect multiple websites 130 to the Internet. A website hosting system 100 may host thousands of websites 130 on one or more hosting servers 120.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The newer IP address standard, often called IP Version 6 (IPv6) is a 128-bit binary number. The standard human readable notation for IPv6 addresses presents the address as eight 16-bit hexadecimal words, each separated by a colon (e.g., 2EDC:BA98:0332:0000:CF8A:000C:2154: 7313). These notations are used to improve human readability.

IP addresses, however, even in human readable notation, are difficult for people to remember and use. A Uniform Resource Locator (URL) is much easier to remember and may be used to point to any computer, directory, or file on the Internet. A browser is able to access a website 130 on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD. For certain TLDs (e.g., .biz, .info, .name, and .org) the Registry is also the authoritative source for contact information related to the domain name and is referred to as a "thick" Registry. For other TLDs (e.g., .com and .net) only the domain name, registrar identification, and name server information is stored within the Registry, and a Registrar is the authoritative source for the contact information related to the domain name. Such Registries are referred to as "thin" registries. Most gTLDs are organized through a central domain name Shared Registration System (SRS) based on their TLD.

A person browsing the Internet or an owner of a website may use a client device 150, such as, as non-limiting examples, a cell phone, PDA, tablet, laptop computer, or desktop computer to access a website via the Internet.

Websites 130 may have a plurality of webpages and may be hosted or operated from a hosting server 120. The hosting server 120 may be, as a non-limiting example, one or more Dell PowerEdge(s) rack server(s) although other types of servers, combinations of one or more servers, server software and applications may be used. The webpages may have one or more display fields as well as one or more data entry fields.

Some websites are news websites or news platforms that aggregate and collect news events from various news sources. Each news event may affect one or more industries and one or more affected areas.

Some websites are social media platforms that aggregate and collect social media information, i.e., data entered by individual users of the social media platform. Information from one or more social media platforms, each having a plurality of user accounts, may be aggregated. Trending topics may be determined by, as a non-limiting example, finding keywords and determining the frequency of the keywords within a given time period within the social media information. The trending topics may be treated as news events as the trending topics may affect one or more industries and each trending topic may affect one or more affected areas.

A website hosting system 100 may host a plurality of websites 130 for a plurality of customers. (Step 400) The customers are the owners of the websites 130 and may appoint agents or contacts for their websites 130. The websites 130 may be hosted on one or more hosting servers 120 operated and maintained by the website hosting system 100. The website hosting system 100 may also include a database 140 to store data used by the website hosting system 100.

The website hosting system 100 may determine a contact 160 for one or more websites 130. The contact for a website 130 is a person who may approve changes made to the website 130 by the website hosting system 100 before the website 130 with the changes is published. The contact is not a person that merely accesses and/or receives information from the website 130. The contact is the owner of the website 130 or another person or entity, i.e., agent, appointed by the owner of the website 130.

As every published website 130 is pointed to by at least one domain name, the contact may also be a person listed as one of the contacts for the domain name pointing to the website 130. The website hosting system 100 will have information on contacting the contact via a client device 150, such as having a cell phone number of the client device 150. In this manner, the website hosting system 100 may be able to contact, display suggested updates of a website 130 and/or get approval for updates of a website 130 from the contact for the website 130.

The website hosting system 100 may offer a service to its hosting customers, i.e., owners of the websites 130 being hosted on the hosting servers 120, of updating their websites 130 based on currently received news events from new source(s) and/or trending topics from one or more social media platforms 110. Website owners may select this service for their website(s) 130, possibly for a fee.

The technological advantage of the present system over prior systems is that the websites of the present invention may be automatically (without human intervention) updated to reflect the very latest received news events. In prior systems, an owner or agent of a website would have to monitor or watch news events and then manually make changes to his/her website. Monitoring or watching news events is not humanly possible 24 hours a day, 7 days a week, while the current system is able to do that.

Another technological advantage of the present system is that preselected updates, edits or advertisements may be incorporated into the website in real time upon receiving a news event. Prior systems require an owner or an agent of the website, after finding out about the news event, to manually update the website which takes additional time. The additional time needed to manually update the website may make the changes not as current (as automated changes). This may be an important technological advantage for time sensitive news events.

In some embodiments, the website owners may select whether they want to manually approve all updates to their websites 130 before publishing the updated websites 130 or whether their websites 130 may be automatically (without human intervention) published after the website 130 is updated. In other embodiments, the system may operate in an approval only mode while still other embodiments may only operate in an automatic publishing mode (no approval requested or received).

Figure 2:
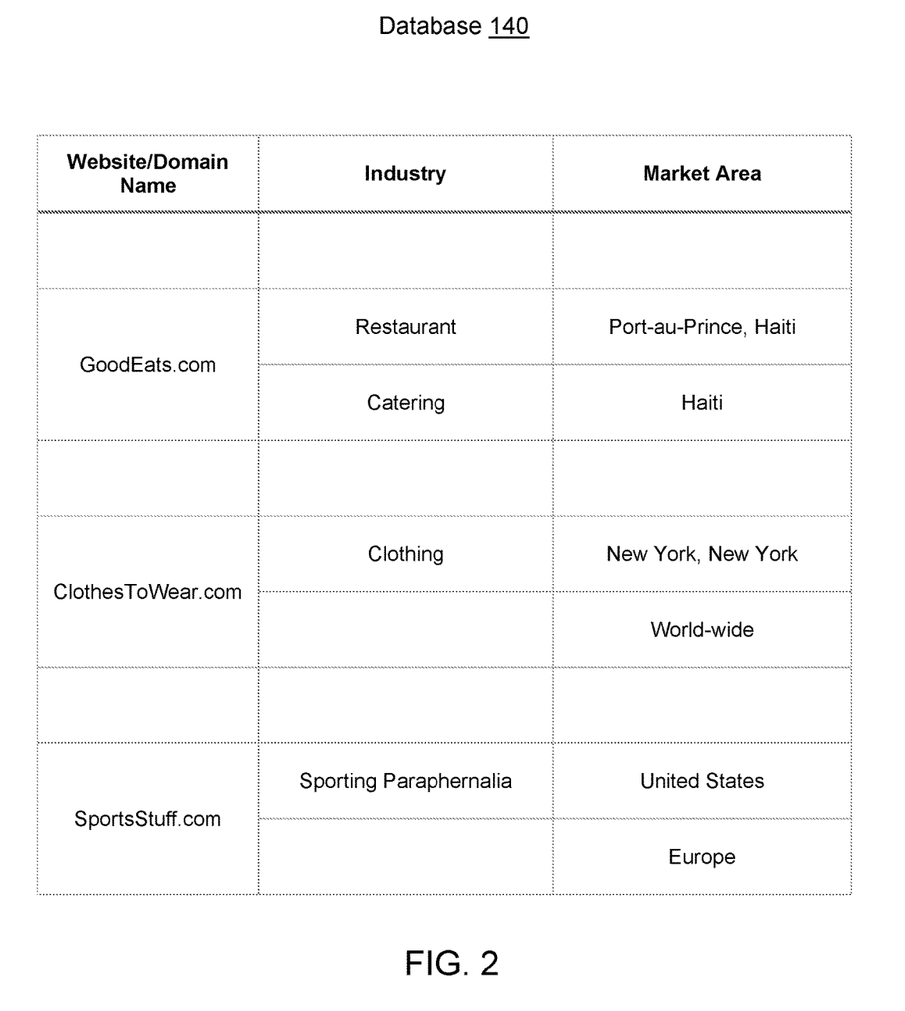
FIG. 2 is an illustration of possible data that may be stored in a database that may be used to link a website or a website's domain name with one or more industries and one or more market areas. For a plurality of websites, the database may link each website to one or more industries and one or more market areas.

Referring to FIG. 2, the website hosting system 100 may create a database 140 that stores metadata for a plurality of websites 130. These websites 130 are preferably the websites 130 that their owners selected to update based on current news events and/or information or trending topics from one or more social media platforms 110. As examples, the websites 130 (domain names) GoodEats.com, ClothesToWear.com and SportsStuff.com may be stored in the database 140.

One or more market areas may be determined for each website 130 hosted by the website hosting system 110 by receiving this information from the owner 160 of the website 130, by parsing the text of the website to determine market areas (such as be determining the language used or geographic references made in the website) or by examining the geographic locations assigned to the IP addresses of the customers of the website 130.

The database 140 may link or associate each website 130 (or its domain name) with one or more industries. As examples, the website 130 (domain name) GoodEats.com may be associated with the industries Restaurant and Catering, the website 130 (domain name) ClothesToWear.com may be associated with the industry of Clothing and the website 130 (domain name) SportsStuff.com may be associated with the industry of Sporting Paraphernalia.

One or more industries for each website 130 may be determined by receiving selected industries from the owner 160 of the website 130 and/or by parsing the text or the images in the website 130.

It should be appreciated that the industries may be organized as separate categories or in a hierarchy so that, for example, the industry of food may be the parent for the children industries of restaurant and catering. This allows the website hosting system 100 and/or owner of the website 130 to select broad or narrow industries, depending on how sensitive the website hosting system 100 and/or the owner of the website 130 desire the website 130 to be in response to news events and/or social media information.

The database 140 may also link each website 130 with one or more market areas. As examples, the website 130 (domain name) GoodEats.com may be associated with the market areas Port-au-Prince, Haiti and Haiti, the website 130 (domain name) ClothesToWear.com may be associated with the market areas New York, N.Y. and World-wide and the website 130 (domain name) SportsStuff.com may be associated with the market areas of United States and Europe.

As with the industries, it should be appreciated that the market areas may also be organized as separate categories or in a hierarchy so that, for example, the market area of World-wide may be the parent for the children market areas of United States and Europe. This allows the website hosting system 100 and/or owner of the website 130 to select broad or narrow market areas, depending on how sensitive the website hosting system 100 and/or the owner of the website 130 desire the website 130 to be in response to news events and/or social media information. (Step 410)

It should also be appreciated that some events may have a large local impact with a smaller world-wide impact. Some websites 130 that are not part of the local impact, i.e., have websites 130 directed towards customers that are not directly affected by the event, may still wish to provide information or assist in providing relief efforts even to areas outside of the website's market area(s).

The website hosting system 100 may monitor one or more news sources and/or one or more social media platforms 110 for news events and information, such as trending topics. The website hosting system 100 may receive the news from online and offline sources. The website hosting system 100 preferably receives news feeds from a plurality of different news sources that transmit current news events to the website hosting system 100. The website hosting system 100 may also receive news feeds from a plurality of different social media platforms 110 that transmit information (such as trending topics) to the website hosting system 100. (Step 420)

The website hosting system 100, upon receiving news events from news sources and/or information from social media platforms 110, may determine one or more affected industries and one or more affected areas for each received news event and trending topic. The website hosting system 100 may use any desired method to determine the affected industries and the affected areas of the news events or the trending topics. As a non-limiting example, the news events and/or information from social media platforms 110 may have tags or descriptive headers that may identify the affected industries and/or affected areas.

As another non-limiting example, the website hosting system 100 may parse the text of the news events and/or information from the social media platforms 110 into tokens. (Step 430)

Using artificial intelligence or machine learning algorithms, the website hosting system 100 may determine the affected industries and the affected areas of the news event or information from the social media platforms 110. (Step 440) As another example, the tokens or the text of the news event or information from the social media platforms 110 may be compared to preselected keywords to determine the affected industries and/or affected areas. The keywords that are searched for in the text of the news event or information from the social media platforms 100 may be selected by the website hosting system 100 or by the owner or agent for the website 130.

Figure 3:
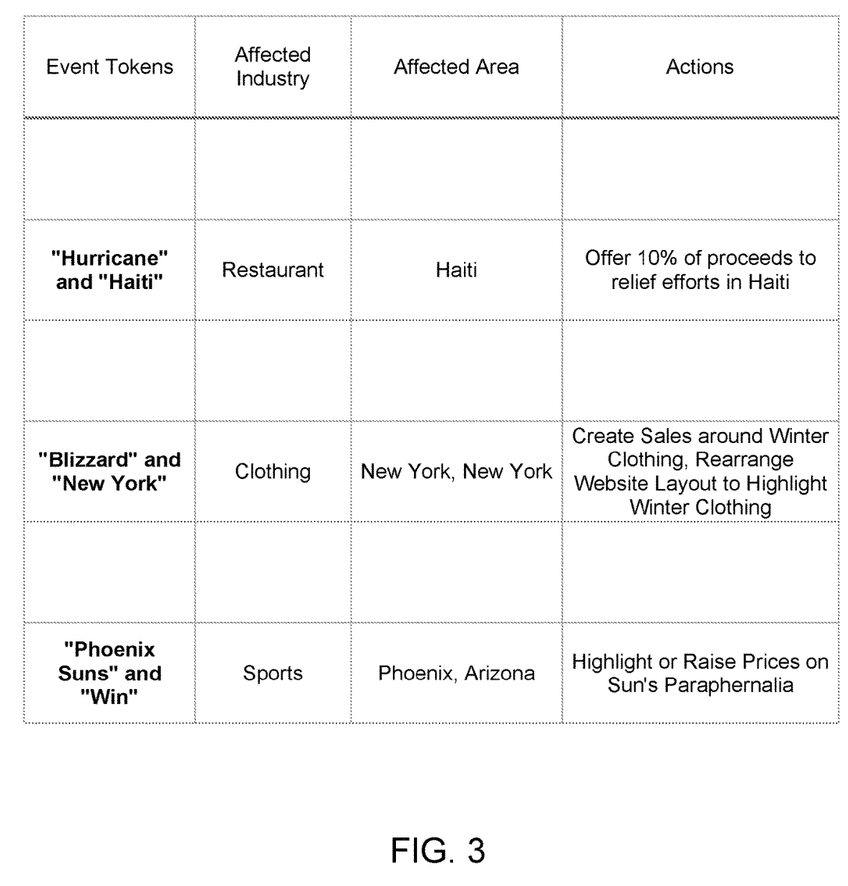
FIG. 3 is an illustration of a table with an event broken into tokens that are used to determine one or more affected industries and one or more affected areas that are affected by the event. The table also shows how the event, affected industry and/or affected area may be used to determine an action. The actions may be linked in a database to event tokens, affected industries and/or affected areas or artificial intelligent using, as an example, machine learning, may be used to determine the actions based on the event, affected industries and/or affected areas.

FIG. 3 illustrates an example table that may be stored in the database 140 and used to determine one or more actions that may be appropriate responses to the current news event or information from the social media platforms 110. (Step 450) One or more affected industries and one or more affected areas may be determined for each news event.

As a non-limiting example, the tokens or keywords "hurricane" and "Haiti" may be parsed from a current news event. In practice, the table in FIG. 3 would preferably lists all of the affected industries that may be affected by a news event. As a simplified example, FIG. 3 shows that the affected industry of "Restaurant" may be affected by the news event of a hurricane in Haiti.

FIG. 3 also illustrates how the event tokens and/or keywords, affected industries and/or affected areas may be used to determine one or more actions that websites 130 may take in response to the news event. As an example, a news event with the tokens or keywords "Blizzard" and "New York" found in the text of a news event may be used to determine an affected industry of "Clothing," an affected area of "New York, N.Y." and/or the actions of, as non-limiting examples, creating sales around winter clothing and/or rearranging a website layout to highlight winter clothing for a website 130.

The website hosting system 100 may use the affected industries and affected areas from the news event or from the information from social media platforms 110 to determine which websites 130 the website hosting system 100 is hosting and have requested this service are also in an industry in the affected industries and has a market area in the affected areas. In other words, the website hosting system 100 determines which websites 130 (or more specifically the underlying businesses of the websites 130) are going to be impacted and/or may be customized in response to the news event or information from the social media platforms 110.

As an example, the website hosting system 100, while monitoring a plurality of news sources, may discover a news event of a hurricane approaching or hitting Haiti. From this, the website hosting system 100 may determine one or more affected industries and one or more affected areas that will be affected by the hurricane approaching or hitting Haiti. As examples, the website hosting system 100 may determine that the industry of "Restaurant" may be affected by the hurricane (along with many other industries) and that the affected area is "Haiti" (along with other affected areas).

The website hosting system 100 may determine, from the websites 130 it is hosting and that have asked for the service of being updated based on news or social media events, which websites 130 are in an industry overlapping the affected industries and are in a market area overlapping the affected areas. As illustrated in FIG. 2, the website 130 (domain name) GoodEats.com is in the "Restaurant" industry and in the "Haiti" market area. Thus, the website hosting system 100 may determine the website 130 (domain name) GoodEats.com is a website 130 (or its underlying business) that is likely to be affected by this news event.

The website hosting system 100 may use the information it has regarding the website 130, e.g., industries and market areas, and/or the news event, e.g., affected industries and affected areas, to determine one or more appropriate actions to take for the website 130 in light of the news event. As an example, the website hosting system 100 may determine that the website 130 may want to promote and offer 10% of all sale proceeds be donated to relief efforts in Haiti.

As another example, the website hosting system 100, while monitoring a plurality of news sources, may discover a news event of a blizzard approaching the Northeastern United States. From this, the website hosting system 100 may determine one or more affected industries and one or more affected areas that will be affected by the blizzard. As examples, the website hosting system 100 may determine that the industry of "Clothing" may be affected by the blizzard (along with many other industries) and that one of the affected areas is "New York, N.Y." (along with other affected areas).

The website hosting system 100 may determine which websites 130 are in an industry overlapping the affected industries and are in a market area overlapping the affected area. As illustrated in FIG. 2, the website 130 (domain name) ClothesToWear.com is in the "Clothing" industry and in the "New York, N.Y." market area. Thus, the website hosting system 100 may determine the website 130 (domain name) ClothesToWear.com is a website 130 (or its underlying business) that is likely to be affected by this news event.

The website hosting system 100 may use the information it has regarding the website 130, e.g., industries and market areas, and/or the news event, e.g., affected industries and affected areas, to determine one or more appropriate action to take for the website 130 in light of the news event. As an example, the website hosting system 100 may determine that the website 130 may want to create sales around winter clothing and/or rearrange the layout of the website 130 to highlight winter clothing.

As another example, the website hosting system 100, while monitoring news sources and/or social media platforms 110, may discover a news event of the Phoenix Suns winning a playoff game in basketball. From this, the website hosting system 100 may determine one or more affected industries and one or more affected areas that may be affected by the sporting event. As examples, the website hosting system 100 may determine that the industry of "Sports" may be affected by the sporting event and that one of the affected areas is "Phoenix, Ariz."

The website hosting system 100 may determine which websites 130 are in an industry overlapping the affected industries and are in a market area overlapping the affected area. As illustrated in FIG. 2, the website 130 (domain name) SportsStuff.com is in the Sporting Paraphernalia industry and in the United States' market area. Thus, the website hosting system 100 may determine the website 130 (domain name) SportsStuff.com is a website 130 (or its underlying business) that is likely to be affected by this sporting news event.

The website hosting system 100 may use the information it has regarding the website 130, e.g., industries and market areas, and/or the news event, e.g., affected industries and affected areas, to determine one or more appropriate action to take for the website 130 in light of the news event. As an example, the website hosting system 100 may determine that the website 130 may want to highlight or raise prices on the Phoenix Sun's sporting paraphernalia.

It should be noted that a single event may affect a plurality of industries and/or a plurality of areas. The website hosting system 100 may customize the action for each website 130 affected by the news event. It is also possible for different websites 130 that are in the same industry and the same market area to take different actions, if so desired by either the website hosting system 100 or the owners of the websites 130. The actions may also be based on the current content of each website 130. Thus, the actions may be customized based on the content of the website where the actions will be incorporated.

The website hosting system 100 may communicate the action to the client device 150 so that the contact 160 may make updates and publish the website 130 to the Internet as the contact 160 desires. In other embodiments, the website hosting system 100 may customize and publish an updated website 130 automatically and without further input from the contact 160.

If an owner or agent for a website has preapproved updates to be made to their website 130, further approval is not necessary. Although, even if preapproval has been given, a courtesy notification of the update to the website 130 may be sent, possible via email or cell phone message, to the owner or agent of the website 130.

If an owner or agent for the website 130 has not preapproved updates to be made to their website 130, the website hosting system 100 may request and receive approval from the contact 160 before updating and publishing the website 130. The website hosting system 100 may determine a contact for each website 130 determined to be affected by the news event or information from a social media platform by searching a customer account managing the website 130. The contact for each website 130 may be the owner or agent of the website 130 or a person or entity appointed by the owner or agent of the website 130 to manage, provide necessary approvals and receive notifications regarding the website 130.

The website hosting system 100 may search the database 140 for a standard notification to send to the contact based on either the website 130 (industry and market area) and/or event (affected industry and affected area). In other embodiments, suggested updates may be made to the website 130 and the updated website 130 may be displayed to the contact 160 on a client device 150 before publishing the website 130 to the Internet. This permits the contact 160 to see the updated website 130 before publishing the website 130 to the Internet for all Internet users to see. If the owner or agent of the website 130 does not approve the updates or ignores the update request, the updates are not made to the website 130. The contact 160 may ignore or disprove any requested updates and then manually make whatever updates the contact 160 wishes to make to the website 130 before republishing the website 130.

Updates or actions to websites 130 that are preapproved or approved by the owner or agent of the website 130 may be made to the website 130 and the updated website 130 may then be published to the Internet. (Steps 470 and 480) In some embodiments, the updates may involve amending or adding HTML code to the HTML code of the website 130. In other embodiments, audio, picture(s) and/or video(s) from one or more news sources or social media platforms 110 may be linked to and displayed on the website 130. In other embodiments, audio, pictures, videos and/or advertisements may be prelinked, tied to, associated with or related to one or more goods and services and when the goods and/or services are updated due to a current event from a news source or a social media platform 110, the audio, pictures, videos and/or advertisements from the news source or from the social media platform 110 may be displayed on the website 130 using any known or later developed technique.

As an example, a picture of a coat may be linked to the coat and stored in a database 140 accessible by the website hosting system 100. When an event, such as an approaching winter storm, is detected that covers the market area and covers the industry of the website 130, the website hosting system 100 may determine, preferably based on criteria entered and/or selected by the agent and/or owner of the website 130, that the picture of the coat should be displayed on the website 130, possibly as part of an advertisement for the coat. In some embodiments, audio, pictures and/or videos of the triggering event (in this example, the winter storm) may also be displayed on the website 130 with the picture or video of the goods and/or services as part of the overall advertisement.

Figure 5:
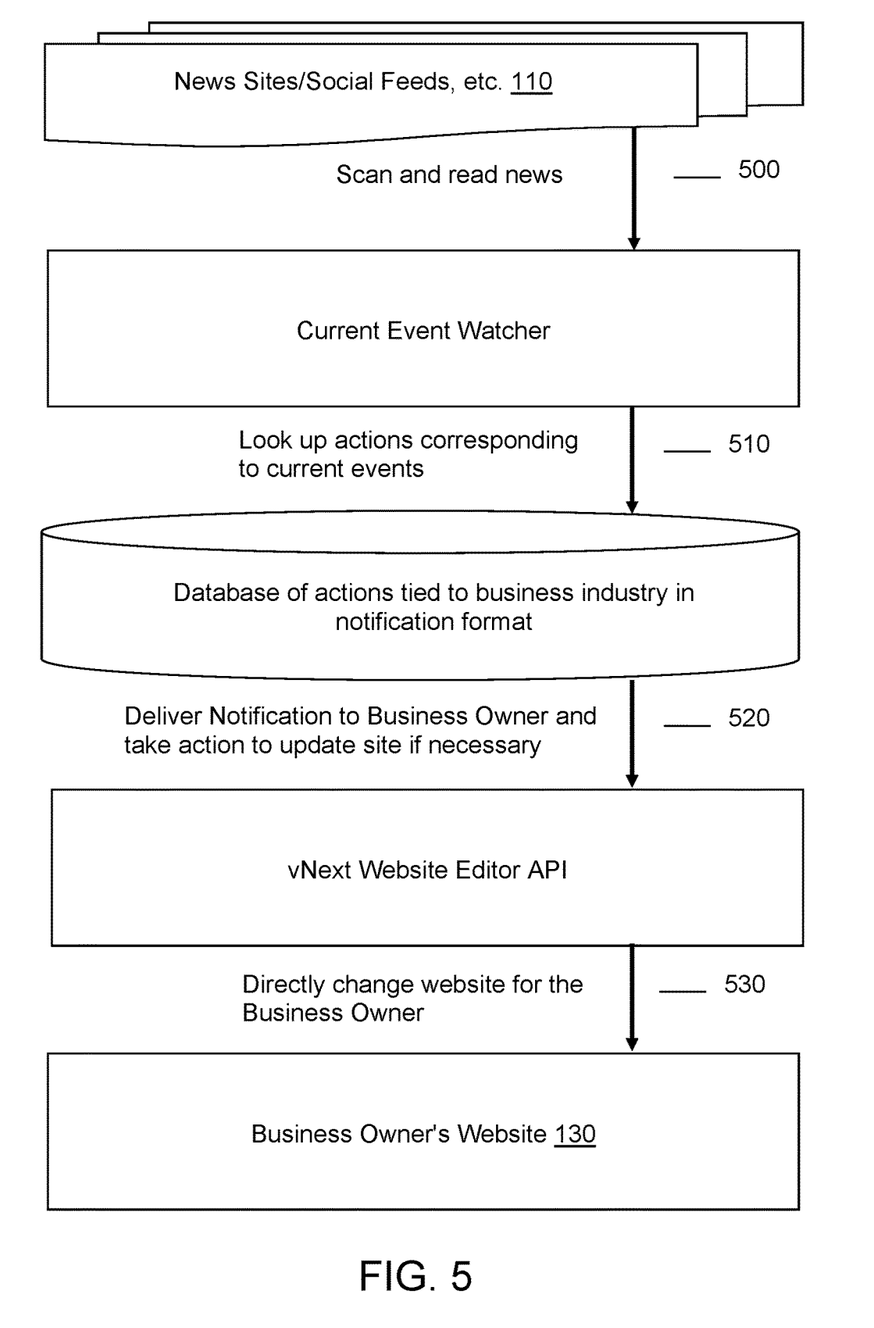
FIG. 5 is a flowchart illustrating another example embodiment for updating one or more websites in response to news events and/or information from one or more social media platforms.

Another embodiment is illustrated in FIG. 5. The website hosting system 100 may be connected to, and receive one or more events from, one or more news sources (such as news websites or news feeds) and/or one or more social media platforms feeds 110. The website hosting system 100 may scan or parse the events for one or more keywords. (Step 500)

Each keyword or a combination of keywords may be associated or linked in a database 140 with one or more actions. As an example, if an event is detected that indicates an artist or actor died (possibly by discovering the keywords "died" or "death" next to a keyword that is a name of the artist or actor), these keyword(s) may be linked to the action of placing notices of condolences on some websites 130 and the action of promoting on some websites 130 paraphernalia (shirts, songs, movies, etc.) related to the career of the artiest or actor. It is also possible for the same website 130 to display a condolence message and promote goods and services at the same time. A current event watcher, as part of the website hosting system 100, may use the keyword(s) to look up the associated action(s) stored in a database 140. (Step 510) The same event from a news source or a social media platform 110 may be used to trigger different events in two or more different websites 130.

The website hosting system 100 may use a database 140 of actions tied to one or more business industries. The actions may be in a notification format that may be sent to the contact (preferably the agent or owner) for the website 130. (Step 520)

In some embodiments, once the candidate action for the website 130 is determined from the received event, the candidate action may be sent to a contact of the website 130 for approval. In some embodiments, the contact 160 may edit and republish their website 130 after receiving the suggested candidate action.

In other embodiments, an example website 130 may be created from the contact's currently published website 130 updated with the candidate action. The example website 130 may then be displayed on a client device 150 of the contact 160. This allows the contact to see exactly what the website 130 will look like if the candidate action is accepted. The contact may then either approve, ignore or disprove of the candidate action. If the contact approves of the candidate action, the example website 130 may be published so that the general public may then access the website 130 updated with the candidate action. After the website 130 is updated and published, a notification may be sent to the contact 160 informing the contact 160 that the update has been made and the website 130 published.

In some embodiments, the contact 160 may have already preapproved changes to the website 130. In such embodiments, the updates to websites 130 with preapproval may be made automatically and quicker than is possible when human approval is required. In these embodiments, websites 130 with preapproval may be automatically, i.e., without human intervention, updated in response to receiving events from news sources and/or social media platforms 110 that are relevant to the websites 130. (Step 530) As previously discussed, one or more business industries and one or more marketing areas may be determined from the event that overlap one or more business industries and one or more marketing areas of the website 130.

The website hosting system 100 may use, as a non-limiting example, vNext Website Editor API to make the changes to each website 130. After the website 130 has been updated and republished, the contact 160 may be informed, such as by a text message to a cell phone of the contact, that an update to the website 130 has occurred based on a prior approval.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
hosting by a website hosting system a first website and a second website, wherein the first website is connected in a database to a first industry and a first market area and the second website is connected in the database to a second industry and a second market area;
receiving by the website hosting system an electrical transmission over a computer network by a news feed of local and/or world events to detect an event affecting an affected industry and an affected area;
determining by the website hosting system that the first industry, for the first website, is at least partially included in the affected industry and that the first market area, for the first website, is at least partially included in the affected area;
determining by the website hosting system that the second industry, for the second website, is at least partially included in the affected industry and that the second market area, for the second website, is at least partially included in the affected area;
selecting by the website hosting system a first action for the first website based on the affected industry and the affected area;
selecting by the website hosting system a second action for the second website based on the affected industry and the affected area, wherein the first action is different from the second action;
displaying by the website hosting system on a first client device the first action for the first website to a first contact associated with the first website;
displaying by the website hosting system on a second client device the second action for the second website to a second contact associated with the second website;
upon receiving a first approval from the first contact for the first action, updating by the website hosting system the first website in accordance with the first action;
upon receiving a second approval from the second contact for the second action, updating by the website hosting system the second website in accordance with the second action; and
publishing by the website hosting system the updated first website and the updated second website to the Internet.

2. The method of claim 1, wherein displaying by the website hosting system on the first client device the first action for the first website comprises displaying the first website updated in accordance with the first action on the first client device to the first contact before publishing the first website to the Internet.

3. The method of claim 1, wherein monitoring by the website hosting system the news feed of local and/or world events to detect the event further comprises monitoring a plurality of social media platforms.

4. The method of claim 1, further comprising the steps of:
hosting by the website hosting system a plurality of websites; and
connecting in the database each website in the plurality of websites to one or more industries and one or more market areas.

5. The method of claim 1, further comprising the steps of:
storing in the database by the website hosting system a plurality of possible events and a plurality of possible event locations; and
tying in the database by the website hosting system each event in the plurality of possible events and each possible event location in the plurality of possible event locations to one or more industries and one or more market areas.

6. The method of claim 1, further comprising the step of:
receiving by the website hosting system the approval from the first contact for the first action before detecting the event that triggered the first action.

7. The method of claim 1, wherein selecting by the website hosting system the first action based on the first affected industry and the first affected market area further comprises selecting by the website hosting system the first action based on the first affected industry, the first affected market area and a content already displayed on the first website.

8. A method, comprising the steps of:
hosting by a website hosting system a first website and a second website, wherein the first website is connected in a database to a first industry and a first market area and the second website is connected in the database to a second industry and a second market area;
receiving by the website hosting system an electrical transmission over a computer network from a news feed of local and/or world events to detect an event affecting an affected industry and an affected area;
determining by the website hosting system that the first industry, for the first website, is at least partially included in the affected industry and that the first market area, for the first website, is at least partially included in the affected area;
determining by the website hosting system that the second industry, for the second website, is at least partially included in the affected industry and that the second market area, for the second website, is at least partially included in the affected area;
selecting by the website hosting system a first action for the first website based on the affected industry and the affected area;
selecting by the website hosting system a second action for the second website based on the affected industry and the affected area, wherein the first action is different from the second action;
updating by the website hosting system the first website in accordance with the first action;
updating by the website hosting system the second website in accordance with the second action; and
publishing by the website hosting system the updated first website and the updated second website to the Internet.

9. The method of claim 8, wherein monitoring by the website hosting system the news feed of local and/or world events to detect the event and the event location further comprises monitoring a plurality of social media platforms.

10. The method of claim 8, further comprising the steps of:
hosting by the website hosting system a plurality of websites; and
connecting in the database each website in the plurality of websites to one or more industries and one or more market areas.

11. The method of claim 8, further comprising the steps of:
storing in the database by the website hosting system a plurality of possible events and a plurality of possible event locations; and
tying in the database by the website hosting system each event in the plurality of possible events and each possible event location in the plurality of possible event locations to one or more industries and one or more market areas.

12. The method of claim 8, further comprising the step of:
receiving by the website hosting system the approval from the first contact for the first action before detecting the event and the event location.

13. The method of claim 8, wherein selecting by the website hosting system the first action based on the first affected industry and the first market area further comprises selecting by the website hosting system the first action based on the first affected industry, the first affected market area and a content already displayed on the first website.

14. A method, comprising the steps of:
hosting by a website hosting system a website, wherein the website is connected in a database to an industry and a market area;
receiving by the website hosting system an electrical transmission over a computer network from a news feed of local and/or world events to detect an event affecting an affected industry and an affected area;
determining by the website hosting system that the industry for the website is at least partially included in the affected industry and that the market area for the website is at least partially included in the affected area;
selecting by the website hosting system an action for the website based on the affected industry and the affected area;
displaying by the website hosting system on a client device the action for the website to a contact associated with the website;
upon receiving an approval from the contact for the action, updating by the website hosting system the website in accordance with the action;
publishing by the website hosting system the updated website to the Internet.

15. The method of claim 14, wherein displaying by the website hosting system on the client device the action for the website comprises displaying the website updated in accordance with the action on the client device to the contact before publishing the website to the Internet.

16. The method of claim 14, wherein monitoring by the website hosting system the news feed of local and/or world events to detect the event and the event location further comprises monitoring a plurality of social media platforms.

17. The method of claim 14, further comprising the steps of:
hosting by the website hosting system a plurality of websites; and
connecting in the database each website in the plurality of websites to one or more industries and one or more market areas.

18. The method of claim 14, further comprising the steps of:
storing in the database by the website hosting system a plurality of possible events and a plurality of possible event locations; and
tying in the database by the website hosting system each event in the plurality of possible events and each possible event location in the plurality of possible event locations to one or more industries and one or more market areas.

19. The method of claim 14, further comprising the step of:
receiving by the website hosting system the approval from the contact for the action to update the website before detecting the event and the event location.

20. The method of claim 14, wherein selecting by the website hosting system the action based on the affected industry and the affected market area further comprises selecting by the website hosting system the action based on the affected industry, the affected area and a content already displayed on the website.

* * * * *